United States Patent [19]

Gouzien et al.

[11] 4,227,859
[45] Oct. 14, 1980

[54] ROTOR FOR A GYROPLANE

[75] Inventors: Michel J. Y. Gouzien, Bouc-Bel-Air; Edwin Ortega, Marseilles, both of France

[73] Assignee: Societe Nationale Industrielle Aerospatiale, Paris, France

[21] Appl. No.: 923,432

[22] Filed: Jul. 10, 1978

[30] Foreign Application Priority Data

Jul. 13, 1977 [FR] France ............................ 77 21659

[51] Int. Cl.³ ............................................ B64C 27/38
[52] U.S. Cl. ................................ 416/134 A; 416/141
[58] Field of Search ............. 416/134 A, 136, 138 A, 416/141, 106, 107, 140 A

[56] References Cited

U.S. PATENT DOCUMENTS

| | | | |
|---|---|---|---|
| 2,949,967 | 8/1960 | Jovanovich | 416/134 A |
| 3,231,222 | 1/1966 | Scheutzow | 416/141 X |
| 3,484,174 | 12/1969 | McCoubrey | 416/132 |
| 3,669,566 | 6/1972 | Bourquardez et al. | 416/134 |
| 3,762,834 | 10/1973 | Bourquardez et al. | 416/141 |
| 4,012,169 | 3/1977 | Mouille et al. | 416/134 A |
| 4,053,258 | 10/1977 | Mouille | 416/141 X |
| 4,086,024 | 4/1978 | Weiland et al. | 416/107 X |
| 4,087,203 | 5/1978 | Ferris | 416/138 A |

Primary Examiner—Everette A. Powell, Jr.
Attorney, Agent, or Firm—Karl W. Flocks

[57] ABSTRACT

The invention relates to a rotor, specially for a gyroplane. The rotor comprises elongated connecting members respectively inserted between the rotor hub and the rotor blades. Each connecting member comprises a bundle of fibres having a high mechanical strength and agglomerated by a vulcanized elastomer at least in the mid part of the fibre bundle. A rigid tubular sleeve extends in a spaced and surrounding relationship to each elongated connecting member. Each tubular sleeve has an outer end connected to the root part of the respective blade and an inner end with a lateral lug articulated to the blade pitch control lever. An annular elastomer member is inserted in the annular space between the inner end of each tubular sleeve and the corresponding end of the respective connecting member.

6 Claims, 3 Drawing Figures

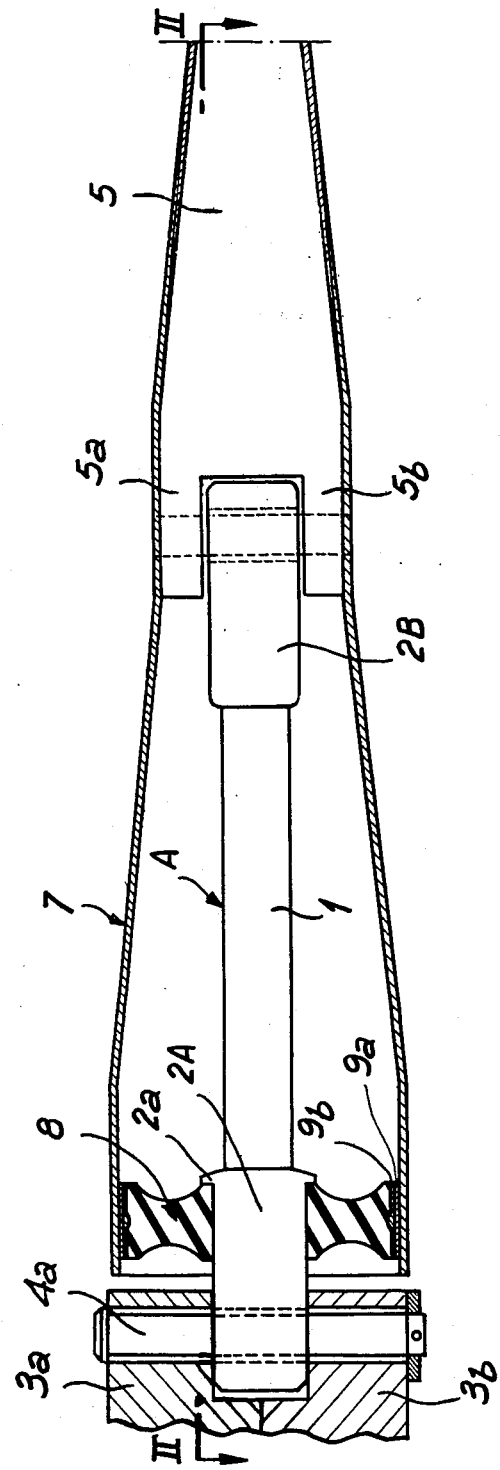

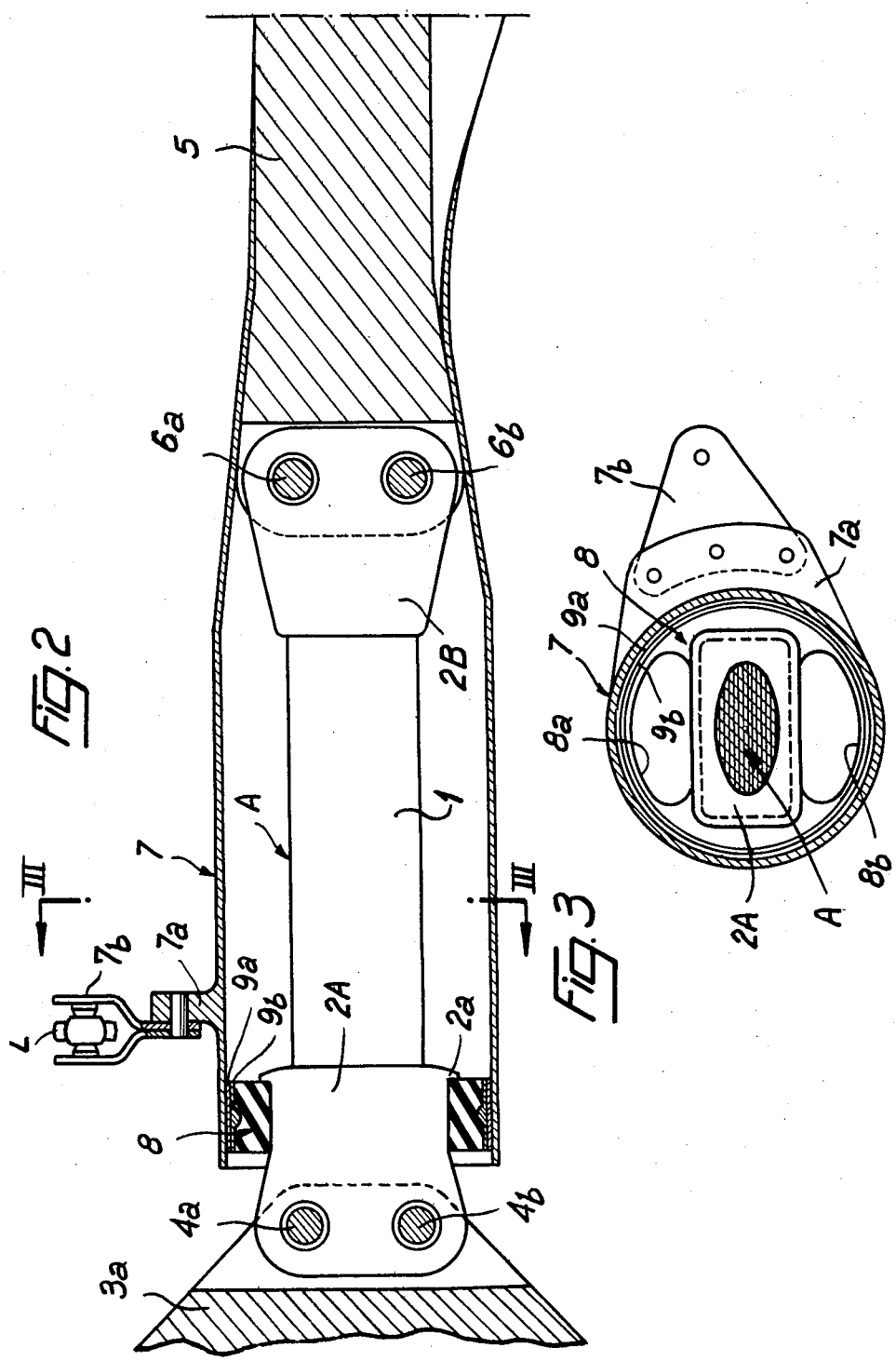

ROTOR FOR A GYROPLANE

The invention relates to a rotor, specially for a gyroplane.

The U.S. Pat. No. 3,669,566 discloses a rotor construction comprising connecting-members respectively inserted between the rotor hub and the rotor blades. Each connecting elememt comprises end portions rigidly secured to said hub and blade, and an intermediate elongate portion, mainly comprising a bundle of fibres. Each fibre is made of a very large member of continuous mineral filaments agglomerated by a polymerized resin, and said fibres are agglomerated by a polymerized resin in said end portions and by a vulcanized elastomer in said intermediate portion.

In the rotor construction according to the above cited U.S. Pat., the beat, drag and pitch-change movements of each blade are permitted by corresponding deformation of the flexible connecting member associated with the blade in question. It is thus relatively difficult to find compromise dimensions for the connecting member since it must oppose the beat movements of the corresponding blade with relatively moderate rigidity but oppose drag movements with very high rigidity, and must also bend to allow the blade to change pitch, by opposing the change with a very weak resilient return torque.

In most of the embodiments of a gyroplane rotor described in the above cited U.S. Pat., the bundles of fibres of the connecting members of at least two blades are end parts of a single bundle of fibres having at least one intermediate part incorporated in the rotor hub. This results in difficult problems in joining the intermediate parts of the fibre bundles to other hub components, which are usually metal.

The invention relates to an improvement in the rotor-construction disclosed in the above cited U.S. Pat. which obviates the aforementioned disadvantages.

The U.S. Pat. No. 3,484,174 to G. A. McCoubrey discloses a rotary wing system comprising pairs of blades arranged on opposite sides of the system axis, a none-piece spar extending across the said axis from the tip of one blade to the tip of the other blade, airfoil panels, bonded to outboard portions of the said spar, and blade cuffs bonded to the inboard ends of the said airfoil panels. The spar is formed from fiberglass strands embedded in a resinous material, so that it is relatively rigid. Moreover, the mid part of the said spar is split for the insertion of hub metal parts used as coupling means with the system mast. Elastomeric bearing means consisting essentially of a solid ring of elastomer is further inserted between each blade cuff and the spar. Such a solid ring of elastomer has a same rigidity in every radial direction, specially in radial directions respectively parallel and perpendicular to the system axis. Moreover, U.S. Pat. No. 3,484,174 does not disclose any rotary wing system having an odd number of blades.

A chief object of the invention is to design a rotor, specially for a gyroplane, comprising a hub, at least one blade and one flexible elongate connecting member, interconnecting said blade and said hub, said connecting member comprising fibres having high mechanical strength and relative elasticity and disposed in an elongate, substantially radial bundle, each fibre being agglomerated by a resin and secured to other fibres by a vulcanized elastomer at least in the mid part of said bundle, at least one rigid tubular sleeve, extending in a spaced and surrounding relationship to said connecting member and having an outer end connected to the root part of said blade, and an inner end with a lateral lug articulated to a blade pitch control lever, and one annular elastomer member inserted in the substantially annular space between the inner end of said sleeve and the inner end of said connecting member, said annular elastomer member having at least one recess adapted to reduce its rigidity in the axial direction of the rotor.

The rotor construction according to the invention results in the bundle of fibres comprised in the respective connecting members of two rotor blades being independent of one another and of the rotor hub, thus obviating the aforementioned difficulties of securing the bundles of fibres to the metal parts of the rotor hub. Moreover, each elastomer bonded connecting member and each recessed annular elastomer member of the rotor according to the invention are much less rigid than the corresponding members according to U.S. Pat. No. 3,484,174, so that reduced forces or torques are needed to control each blade of the said rotor, and a rotor comprising an odd member of blades is possible to be designed according to the invention, since it comprises no one piece spar extending accross the rotor axis.

A preferred embodiment of the rotor according to the invention still presents one at least of the following advantageous features:

(a) each annular elastomer member has at least one recess adapted to reduce its rigidity with which it opposes the beat of the blade in the axial direction of the rotor, compared with the rigidity with which it opposes the drag of the blade. As a result of this feature, the rigidity with which the annular elastomer member opposes beat movements and the different rigidity with which it opposes drag movements can be accurately adjusted simply by appropriately dimensioning the recess or recesses in the annular member, thus greatly facilitating the dimensioning of the corresponding connecting member.

(b) Each annular member is made of elastomer having high hysteresis. This feature is particularly advantageous in increasing the damping of blade motions more particularly of the drag oscillations of the corresponding rotor blade. With rotors according to the above cited U.S. Pat. No. 3,669,566, the blade damping, due mainly to internal friction in the flexible connecting member, was insufficient more particularly for preventing dangerous resonance phenomena when the speed of rotation of the rotor passes through a value corresponding to the frequency of the first natural drag vibration mode of the blade (i.e. approximately 0.7 $\Omega$, $\Omega$ being the rate speed of the rotor).

(c) A plain bearing is inserted between the inner end of each tubular sleeve and the corresponding elastomer member, whereby said tubular sleeve is pivotable around its longitudinal axis and slidable along the same axis. The plain bearing comprises e.g. an outer metal ring secured e.g. by adhesion in the inner end of the tubular sleeve, and an inner ring, preferably of self-lubricating material, secured e.g. by adhesion to the periphery of the respective annular elastomer member. As a first result of this feature the elastomer member does not oppose its natural rigidity to the pivoting of the tubular sleeve or of the blade around its longitudinal axis (this would result in further increasing the force needed to vary the blade pitch, by twisting the connecting member around a longitudinal axis). As a second result of this feature, the centrifugal forces applied to the blade are completely absorbed by the corresponding flexible connecting member, without stressing the annular elastomer member.

The outer end of each connecting member of the rotor according to the invention may be connected to the root part of the corresponding blade by at least two pins extending through matching bores in said member and part. In the preferred embodiment, however, the outer end of each connecting member is solid with the root part of the corresponding blade, thus simplifying the structure of the rotor according to the invention, substantially reducing its total weight, and significantly improving its aerodynamic efficiency.

The following is a description of the preferred embodiment of the invention illustrated in the accompanying drawings in which:

FIG. 1 is a partial view illustrating the connection between the root part of one rotor blade and the rotor hub in section through a plane extending through the rotor axis;

FIG. 2 is a view in section along line II—II of FIG. 1, and

FIG. 3 is a view in section along line III—III in FIG. 2.

The drawings show an elongate, relatively flexible connecting member A, having the structure illustrated in FIGS. 1-3 of the above cited U.S. Pat. No. 3,669,566. Element A comprises an elongated central portion 1 and two rigid ends 2A and 2B. As shown in the section in FIG. 3, the mid part 1 has an oval cross-section and is made up of a bundle of longitudinal fibres which spread out in the ends 2A and 2B, where they fit between flat parallel elements, which may be plates or pieces of cloth, e.g. of glass fibres. The longitudinal bundle of the connecting member A can itself be made up of fibres each comprising thousands or even tens of thousands of single, continuous glass filaments, to obtain a fibre cross-section of a few square millimeters. In a fibre of the aforementioned kind, the filaments can be agglomerated by a polymerized resin, preferably an epoxy resin. In some cases also, use can be made of carbon or boron filaments which have a much higher elasticity modulus, or any other material having suitable characteristics. In the elongated mid part 1, all the fibres are agglomerated by a vulcanized elastomer, which unites them in a single composite bundle. The elastomer is relatively flexible and adheres to the fibres, the surface of which can be prepared to increase the adhesion. The shearing modulus G of the resulting composite material is sufficiently low for the fibres to undergo small relative movements. In addition, the composite material has some remanence on deformation, so that each deformation of the material absorbesenergy. On the contrary, the resin agglomerating the fibres of the bundle in ends 2A and 2B of the connecting element A is a rigid polymerized material, thus having a very high shear coefficient, in order to transmit to the fibres and distrubute theremong the loads from the members to be joined. The substance may e.g. be an epoxy resin of the same kind as that agglomerating the filaments of each fibre. A connecting member such as A, having the aforementioned structure can be replaced with three degrees of freedom with respect to a member secured to one of its ends, e.g. 2A. The various displacements are permitted by deformation of the elongated mid part 1 of the connecting member A, whose fibres vary resiliently in length, while the agglomerating elastomer undergoes an elastostatic distortion.

In the rotor illustrated in the accompanying drawings, the end of each connecting member A is attached to the rotor hub—which e.g. comprises two metal plates 3a, 3b secured together by an appropriate means—via two pins 4a, 4b engaging in matching recesses in members 2A, 3a and 3b, where pins 4a, 4b are retained by any appropriate means. Similarly, in the illustrated embodiment, the outer end 2B of the connecting member A is connected to the root part of the corresponding blade 5 by two pins 6a, 6b extending through matching bores in outer end 2B and prongs 5a, 5b of the forked root part of blade 5.

According to the invention, a rigid tubular sleeve 7 extends in a spaced and surrounding relationship to each connecting member A. Sleeve 7 has an outer end connected to the root part of the corresponding blade 5 and an inner end with a lateral lug 7a (FIG. 2) articulated via a yoke 7b to a lever L for controlling the pitch of blade 5. In this embodiment each rigid tubular sleeve such as 7 is made of a laminated synthetic material and its outer end (the most remote from hub 3a-3b) is stuck to the root part of blade 5, specially to its outer lining. Consequently, the rigid tubular sleeve 7 is firmly secured to the root part of blade 5 and follows its displacements with respect to hub 3a, 3b as permited by the corresponding distortion of the flexible connecting member A.

According to another feature of the rotor according to the invention, an annular elastomer member 8 is inserted into the substantially annular space between the inner end of each rigid sleeve 7 and the corresponding end 2A of the connecting member A. In this embodiment, member 8 is made of an elastomer having high hysteresis and has two large-area recesses 8a, 8b (FIG. 3) respectively above and under the said end 2A, so as to substantially reduce the rigidity with which it opposes forces applied thereto in the axial direction of the rotor, compared with the rigidity with which it opposes forces applied to it in the plane perpendicular to the previously-mentioned direction (i.e. in plane of FIG. 2). In this embodiment, a plan bearing is inserted between the inner end 2A of each connecting member A and the corresponding elastomer member 8; this bearing mainly comprises an outer metal ring 9a secured by sticking into the inner end of the tubular sleeve 7, and an inner ring 9b of self-lubricating material secured by sticking to the periphery of member 8. Accordingly, bearing 9a-9b allows tubular sleeve 7 to pivot around its longitudinal axis and to slide along the same axis. The annular member 8 is force-fitted on the end 2A of the connecting member A, where it is retained by a shoulder 2a.

The beat and drag movements of each blade 5 of the rotor according to the invention are allowed by corresponding deformations of the elongated mid portion 1 of the connecting member A, which also slightly damp these movements. The beat and drag movements are also transmitted to the elastomer member 8 via the rigid tubular sleeve 7 secured to the root part of blade 5 and via the plain bearing 9a-9b, so that the elastomer member 8 is subjected to compression or expansion forces in the plane of FIG. 1 for beat movements, and in the plane (perpendicular thereto) of FIG. 2 for drag movements. As previously stated, owing to the large-area recesses 8a and 8b the elastomer member 8 opposes drag deformation with much greater rigidity than it opposes beat deformation. Since it is made of an elastomer having high hysteresis, it also considerably damps the said movements, specially the drag oscillations of blade 5, which results in the aforementioned advantages. When the lever L controlling the pitch of blade 5 exerts a given torque on the rigid tubular sleeve 7, the latter transmits the pivoting torque to blade 5, after overcoming only the weak resilient torque with which the connecting member A opposes the torsion communicated thereto by the root part of blade 5. The elastomer member 8 is not itself subjected to any torsion, owing to the rotation of the metal ring 9a of the plain bearing on the self-lubricating ring 9b.

Since the tubular sleeve 7 may have a cross-section which varies in continuous, regular manner from a circular shape (shown in FIG. 3) near the hub 3a–3b to a relatively flat form matching that of the root part of the blade 5, the rotor according to the invention can have very high aerodynamic efficiency.

The invention is not restricted to the embodiment described hereinabove but includes all variants. More particularly the inner end of each connecting member A can be secured to the rotor hub by means other than those illustrated and described hereinbefore. Its outer end may be solid with the root part of the corresponding blade, specially in the case of a blade made of synthetic material, possibly having a composite structure. The latter embodiment is particularly light and inexpensive. The plain bearing between the elastomer member and the inner end of the rigid tubular sleeve can be embodied in various functionally equivalent ways. The member shape and arrangement of the recesses in the annular elastomer member may be varied as required.

We claim:

1. A rotor, specially for a gyroplane, comprising a hub, at least one blade and one flexible elongate connecting member, interconnecting said blade and said hub, said connecting member comprising fibres having high mechanical strength and relative elasticity and disposed in an elongate, substantially radial bundle, each fibre being agglomerated by a resin and secured to other fibres by a vulcanized elastomer at least in the mid part of said bundle, at least one rigid tubular sleeve, extending in a spaced and surrounding relationship to said connecting member and having an outer end connected to the root part of said blade, and an inner end with a lateral lug articulated to a blade control lever, and one annular elastomer member inserted in the substantially annular space between the inner end of said sleeve and the inner end of said connecting member, said annular elastomer member having at least one recess adapted to reduce its rigidity in the axial direction of the rotor, a plain bearing between the inner end of said rigid tubular sleeve and said elastomer member, whereby said tubular sleeve is pivotable around its longitudinal axis and slidable along the same axis, said plain bearing including an outer metal ring, secured in the inner end of said tubular sleeve and an inner ring of self-lubrificating material, secured to the periphery of said annular elastomer member.

2. A rotor according to claim 1, wherein said annular elastomer member is made of elastomer having high hysteresis.

3. A rotor according to claim 1, wherein the outer end of said connecting member is secured to the root part of said blade by at least two pins extending through matching bores in said member and said part.

4. A rotor according to claim 1, wherein the outer end of said connecting member is solid with the root part of said blade.

5. A rotor according to claim 1, wherein the inner end of said connecting member is connected to said rotor hub by at least two pins extending through matching bores in said member and hub.

6. A rotor according to claim 1, wherein said rigid tubular sleeve is made of laminated synthetic material and its outer end is stuck to the root part of said blade.

* * * * *